Patented Nov. 2, 1937

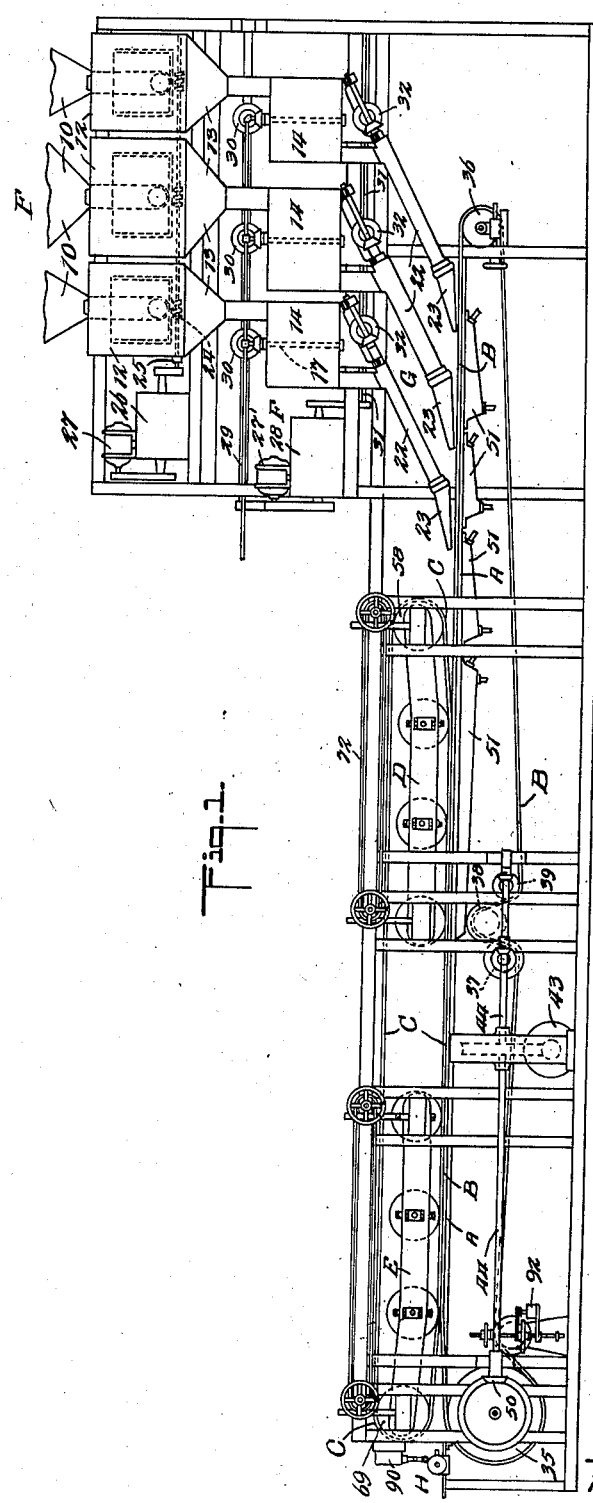

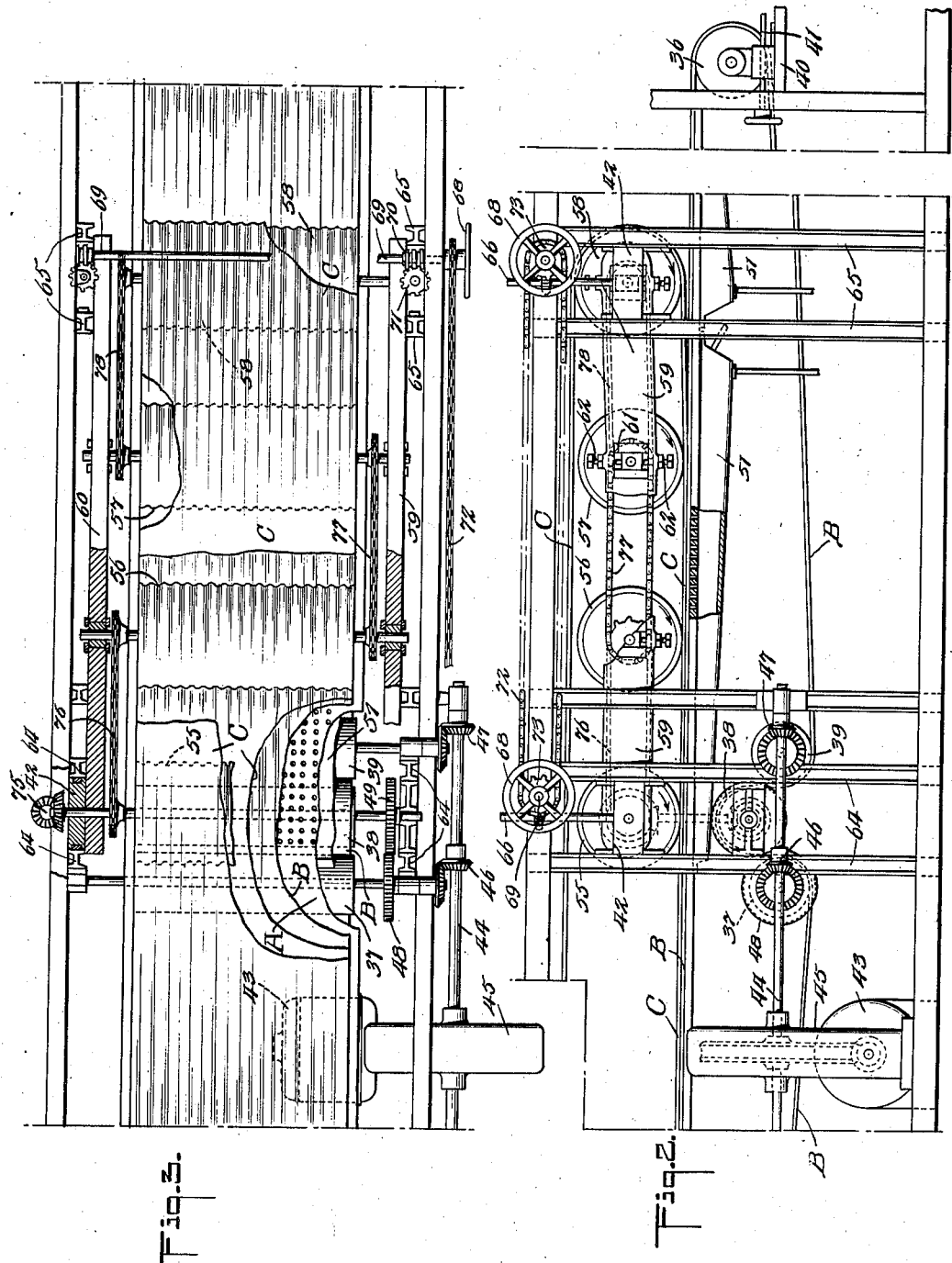

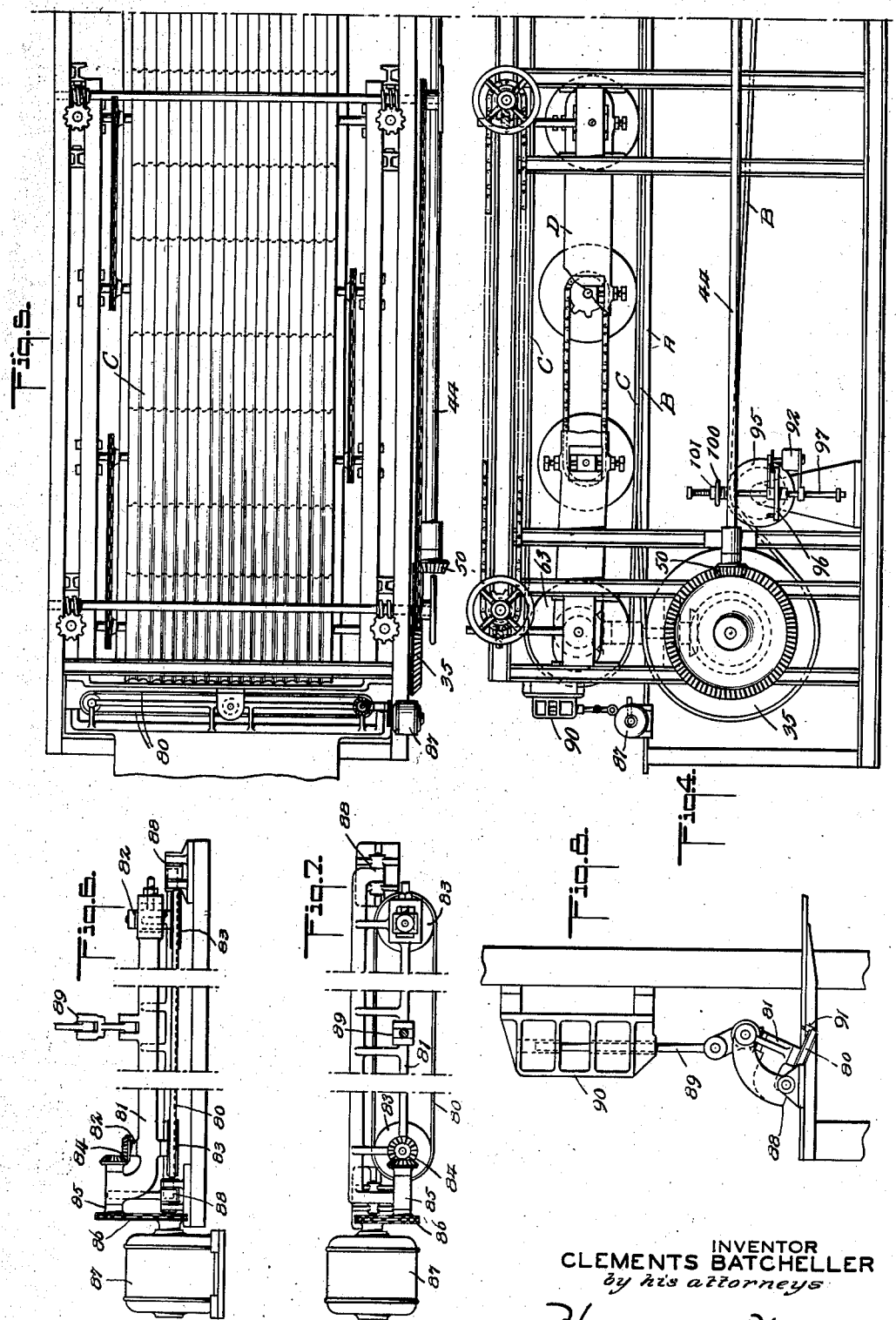

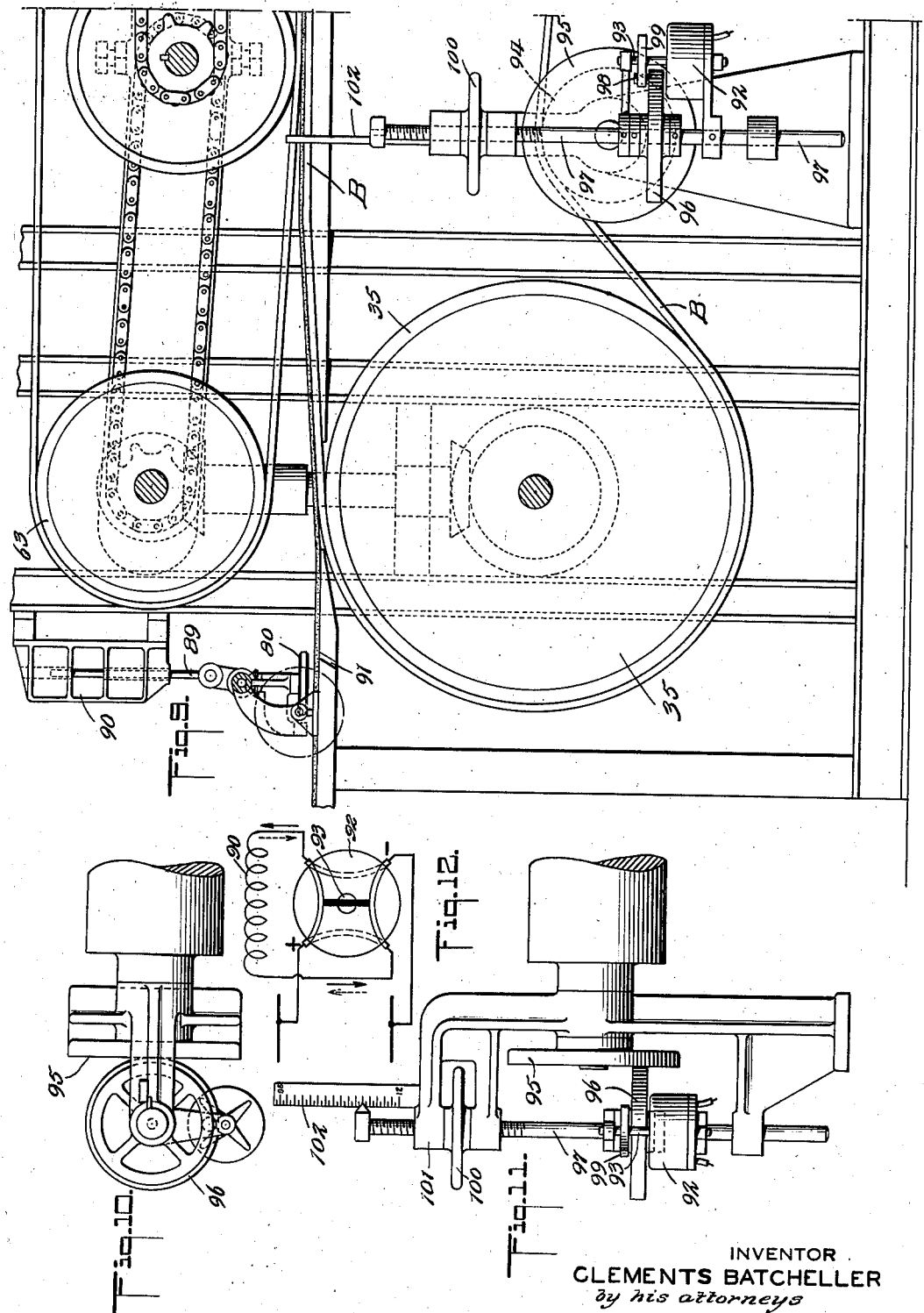

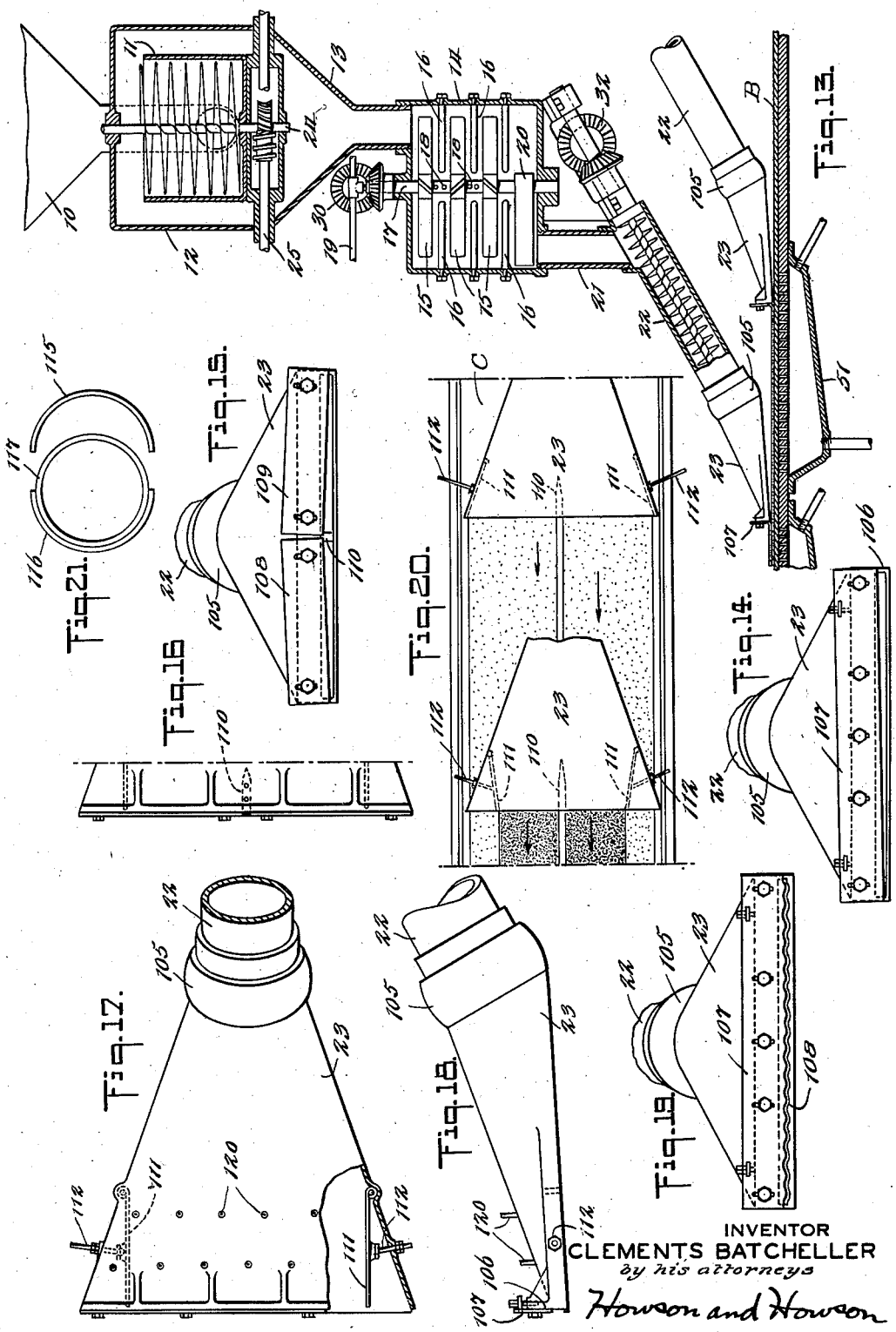

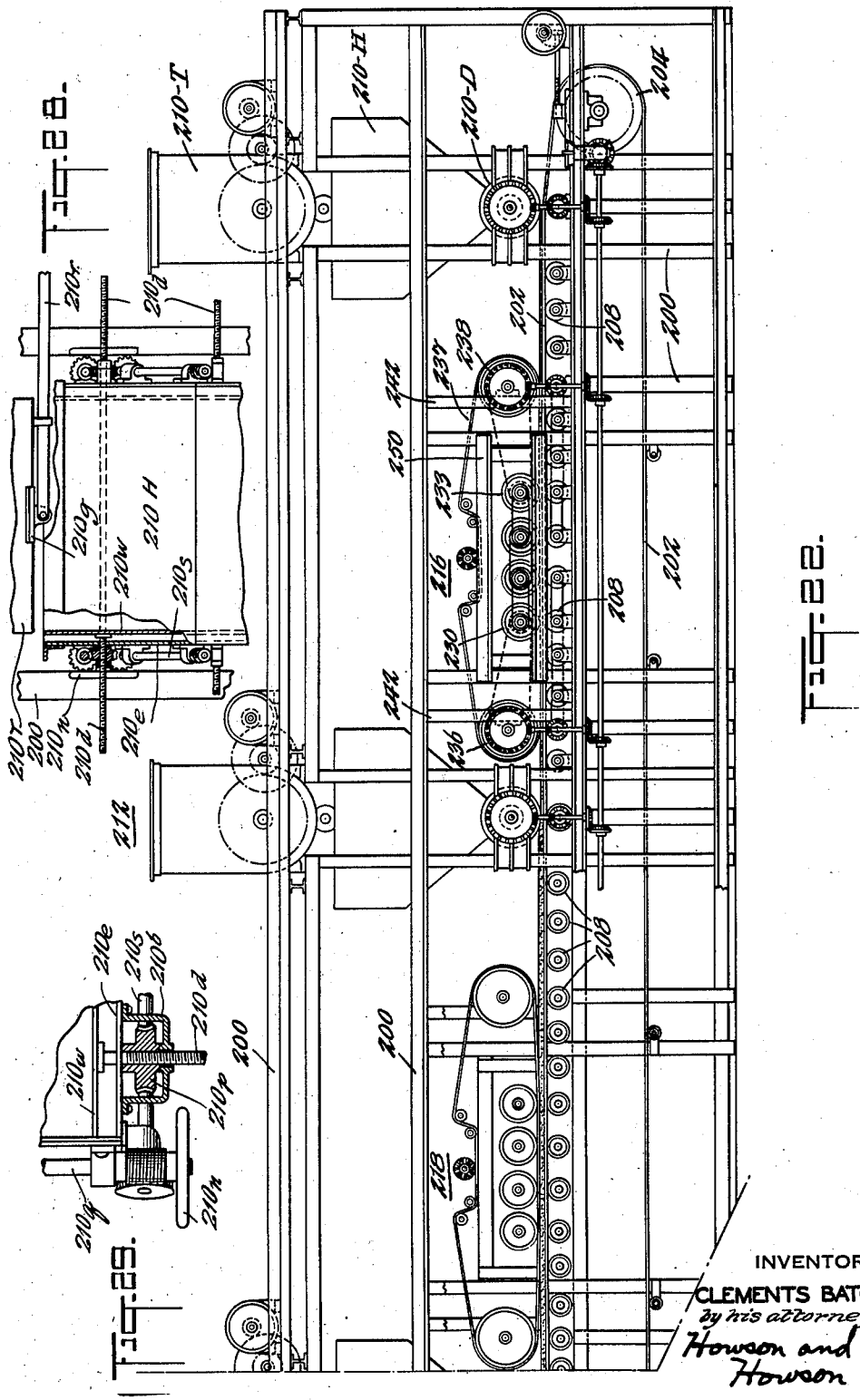

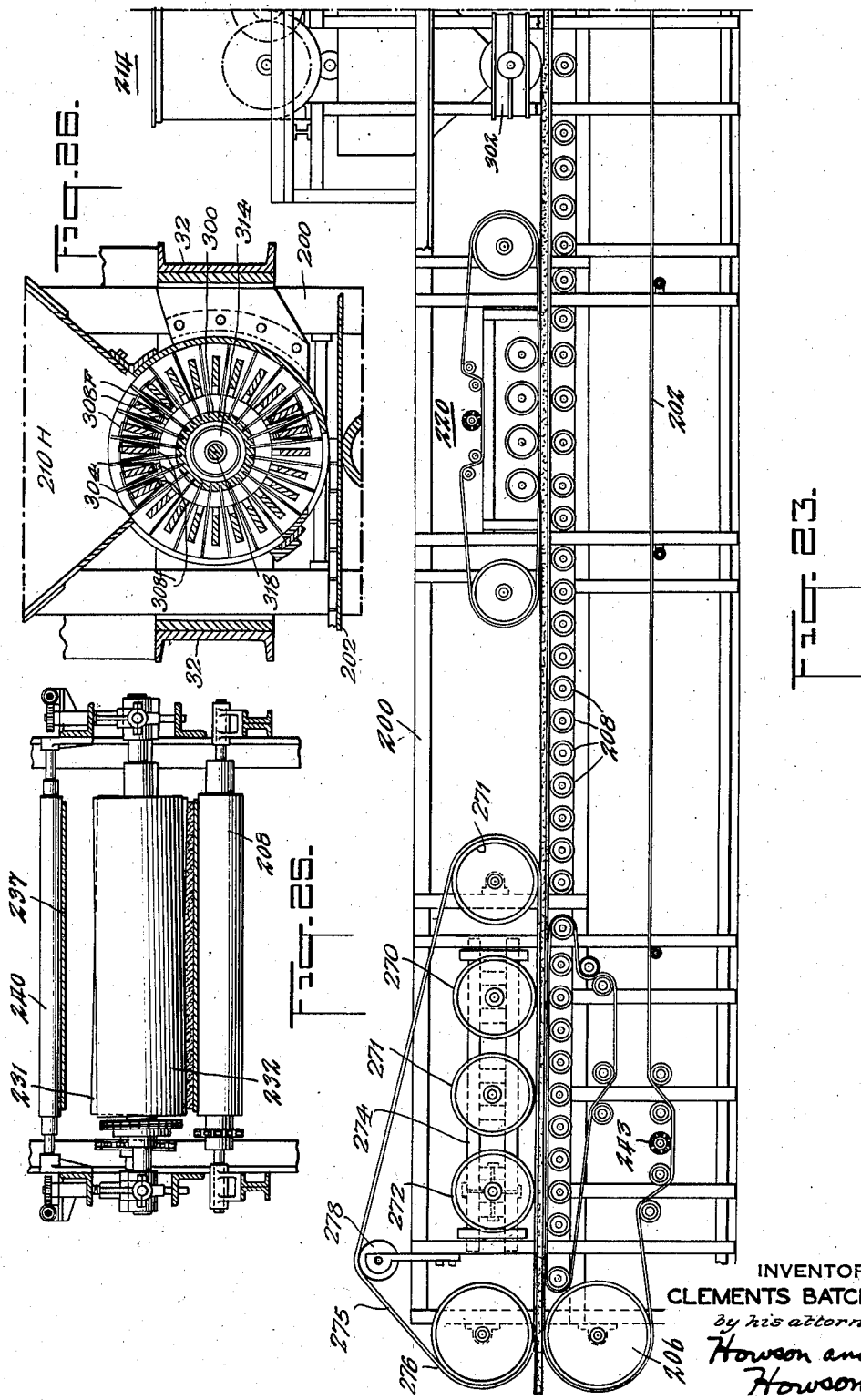

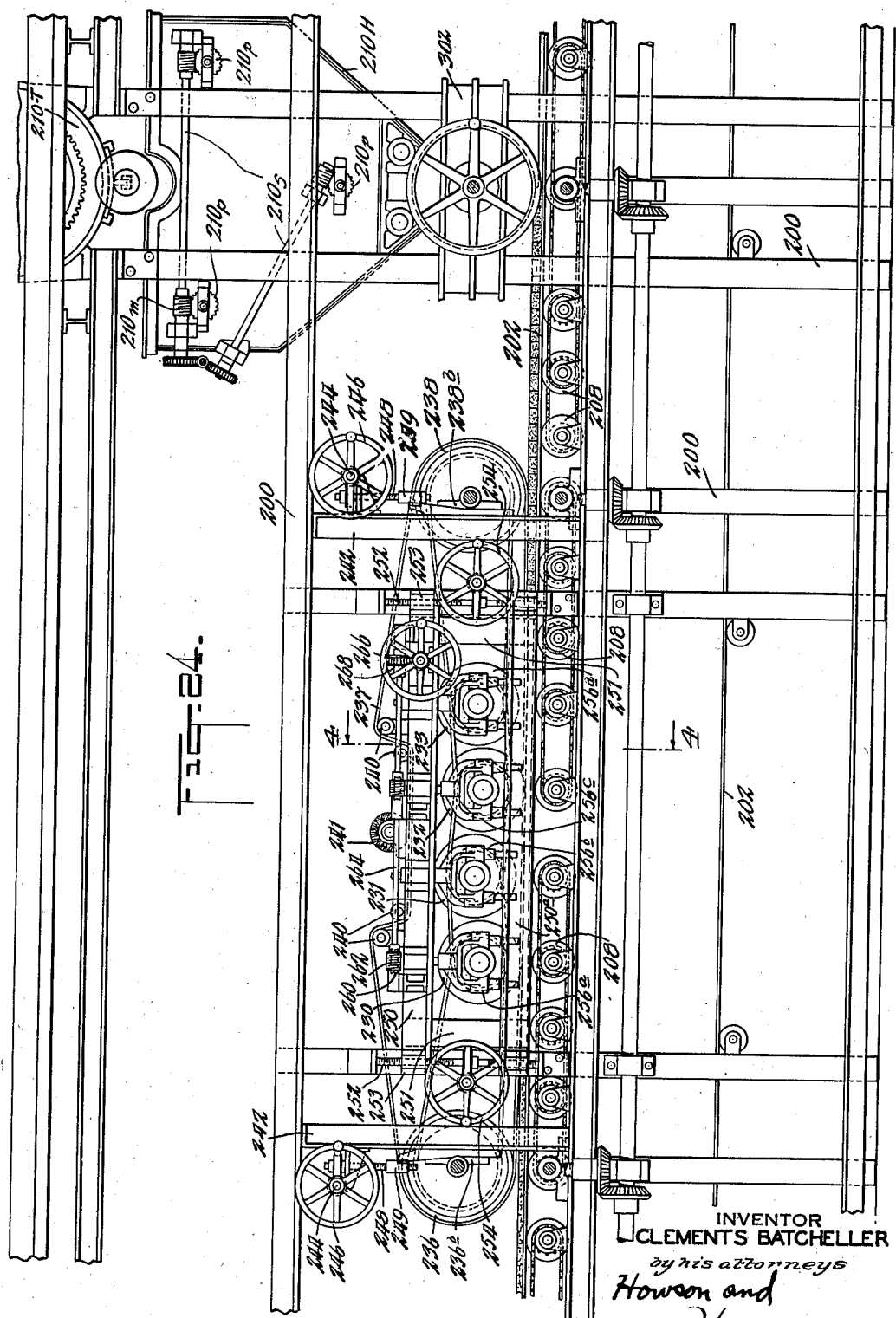

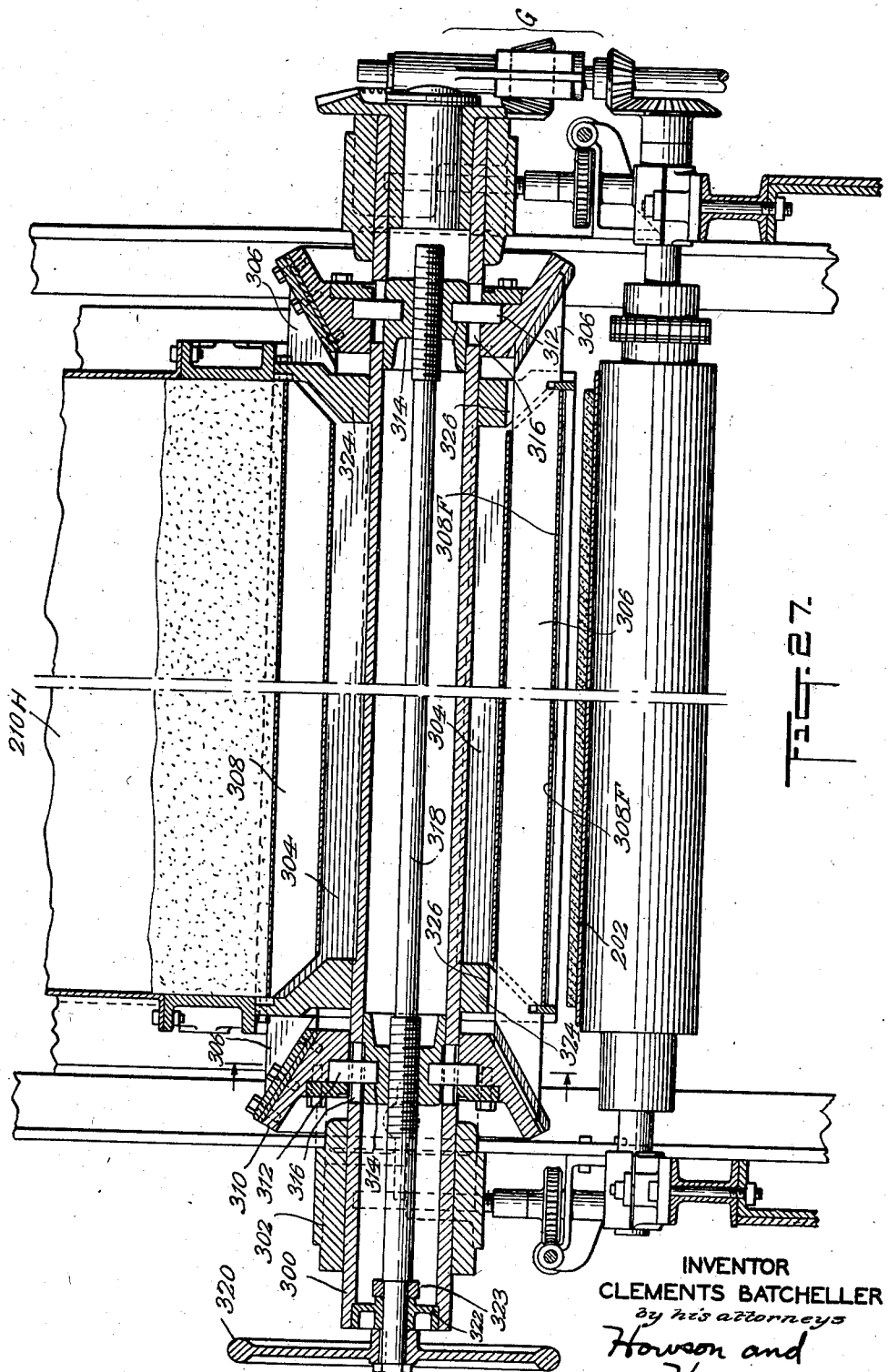

2,097,613

UNITED STATES PATENT OFFICE 2,097,613

PROCESS AND APPARATUS FOR MAKING AND COLORING CEMENT FIBER AND THE LIKE PRODUCTS

Clements Batcheller, Portsmouth, N. H., assignor to Bemis Industries, Incorporated, Boston, Mass., a corporation of Delaware Application July 28, 1931, Serial No. 553,818

31 Claims. (Cl. 25—42)

This invention relates to a process and to an apparatus for the manufacture, by a continuous operation, of sheets, either flat, tapered or of irregular contour, and of shingles, either flat or tapered, these products having as their essential ingredients a binding material usually cementitious, and a fibrous material, the latter being either of mineral fiber, or vegetable fiber or of both mineral and vegetable fiber; and it relates also to the coloration of such products.

The objects of the invention are several and comprise, as the most important, the following:—

1. The provision of a process for the continuous manufacture of the products mentioned above from a mixture of the ingredient materials, this process being capable of producing a coloration of the product to any desired depth by known coloring agents or by coloring agents now made available by this process for products of the sort described.

2. The provision, for carrying out the above process, of a machine which will be universal in the sense that by changing certain details, it will be capable of producing diversified products of the sort mentioned above.

3. The provision of a process and a machine therefor by which a concrete sheet or shingle may be produced from superposed layers of the mixed ingredient materials; thus permitting the use of different mixtures in the different layers and the coloration of the product to a substantial depth in from either surface, all for the purpose of effecting a material saving in the cost of the product and an improvement of the product itself especially in point of durability and variety of color, and of freedom from excessive porosity and brittleness.

4. The provision of a machine capable of making at one time more than one continuous strip, either flat or tapered, which may be cut into shingles.

5. The provision, in a machine of the type mentioned above, of a cutter which will divide the continuously formed strip or strips into sections forming either sheets or shingles of predetermined size, the cutter being automatically operated and being timed in its strokes.

6. The provision of a machine for making a concrete sheet from superposed layers which are pressed in succession to remove surplus water.

7. As general objects there may be given: adaptability to the production of diverse products, economy of time and material, better coloration of the product both as to the durability and the variety of the color and improvement of the product itself.

The invention is illustrated in the accompanying drawings and is described hereinafter by reference thereto, along with a description of the process and of the product produced thereby.

This application is a continuation in part of my application Serial No. 305,489 filed September 12, 1928.

In the drawings;

Figure 1 is a side elevation of one form of a complete machine, according to my invention;

Figure 2 is a side elevation of a portion of the machine showing, in some detail, the forming rollers and their driving mechanism and the relation of said rollers and of the forming belt to the main or carrier belt;

Figure 3 is a top plan view of the portion of the machine shown in elevation in Figure 2, certain parts being broken away;

Figure 4 is a side elevation of the delivery end of the machine showing the pressing rollers and the cutter and their relation to the two belts;

Figure 5 is a top plan view of the portion of the machine shown in elevation in Figure 4;

Figures 6, 7 and 8 are respectively an end elevation, a plan and a side elevation of the cutter;

Figure 9 is a side elevation of a portion of the end of the machine shown in Figures 3 and 4 but in greater detail to illustrate the relation of the cutter and its timing mechanism to the carrier belt;

Figures 10 and 11 are, respectively, a plan and an end elevation of the timing mechanism for the cutter;

Figure 12 is a schematic diagram of the distributing switch used in the timing mechanism and its electrical connections to the cutter solenoid;

Figure 13 is a section through a single extruder unit showing the manner of mixing the ingredients and of feeding them to the carrier belt, and showing also the superposition of one layer of material upon a layer previously deposited on the belt as it travels over the suction boxes;

Figures 14, 15, 16, 17, 18 and 19 are views of various spreaders for depositing the material in ribbon form upon the belt and for giving it the desired cross-sectional shape;

Figure 20 is a plan view of a portion of the machine in the region of the spreaders showing the action of the spreader shown in Figures 15 and 16;

Figure 21 is an end view of a roller showing the way in which it may be changed for making various products.

Figures 22 and 23 are side elevation views of a preferred modification of my invention, Figure 22 being a view of the starting end and Figure 23 being a view of the delivery end of the machine.

Figure 24 is a side elevation view of a presser unit used with a machine shown in Figures 22 and 23.

Figure 25 is an elevation section view taken on line 4—4 of Figure 24.

Figure 26 is an end elevation section view of a device for laying plastic on the belt.

Figure 27 is a vertical section view taken longitudinally through the distributor.

Figure 28 is an elevation view, partly in section of the hopper and lower part of the mixing tank.

Figure 29 is a fragmentary sectional plan view of a portion of the hopper operating mechanism.

A complete machine for the manufacture, by a continuous operation, of products of the class described is made up of the following main parts, viz., a sectional bed plate A supported on a frame of any suitable construction; an endless carrier belt B which travels over the upper surface of the bed plate; a second endless belt C which travels parallel to the carrier belt and is slightly spaced from its upper surface for the major portion of the length of the latter; two sets of cylinders D and E which are supported on the main framework of the machine within the belt C; a mixing plant F; discharge units G which feed material from the mixing plant onto the carrier belt in superposed layers in advance of the belt C, and finally a cutter H at the delivery end of the two belts.

The mixing plant

This plant is designed particularly to produce a number of plastic mixtures of the ingredients which consist principally of cementitious binding and fibrous materials.

By a cementitious binding material, I mean any material having the setting and hardening properties of an hydraulic cement as distinguished from binding materials which do not take a "set". Thus for example, common building lime and plaster of Paris are suitable in addition to hydraulic cement. The materials for the purpose are known and are not part of this invention. The same is true of the fibrous material which may have either a cellulose or vegetable fiber or a mineral fiber, or it may have a combination of the two. A good example of the mixed material is one containing hydraulic cement and asbestos.

The machine may be used to make dry mixtures as well, or a combination of dry and wet mixtures. Separate bodies of mixtures are made so that the composition of some may be different from that of others. Here are shown three mixing units, each unit (Fig. 13) consisting of a hopper 10 which delivers to the bottom of a well 11 within a cylindrical container 12. A spiral conveyor carries the material upward through the well 11 so that it may spill over into the container 12 and be delivered through a converging duct 13 to the mixer 14.

In the mixer 14 is a rotary agitator comprising spaced rotors 15 which have oppositely inclined blades. Between rotors are the fixed baffles 16 formed as arms extending inwardly from the wall of the mixer. The shaft 17 which carries the rotor 15 is hollow and is apertured between rotors as at 18 so that water received from a supply pipe 19 is discharged into the material as it is agitated. At the bottom is a single blade 20 which scrapes the material to an outlet duct 21 which delivers the now plastic mixture to a conveyor 22. The latter, in turn, extrudes the material through a spreader 23 (to be described more particularly hereinafter) onto the belt B.

The conveyors in the wells 11 are driven by worm gear set 24 (see Figs. 1 and 13) from a common shaft 25 which is driven through a variable speed transmission 26 from an electric motor 27.

The shafts 17 of the mixer rotors 15 and the screw conveyors 22 are driven from a single motor 27' through a variable speed transmission 28 so that the operation of the mixers and their conveyors may be in synchronism. A shaft 29 drives a series of short horizontal shafts (not shown) on which are bevel gears 30 which drive the shafts 17. A shaft 31 drives a similar set of horizontal shafts carrying bevel gears 32 for driving the conveyors 22. By this drive the material may be delivered onto the belt continuously in uniform amounts per unit of time.

The hoppers 10 serve as reservoirs to maintain a sufficient supply of dry mixed materials while the conveyors in wells 11 act to regulate the feed of such materials to the mixers. The mixers 14 and the conveyors 22 are so related in capacity that the flow through them will not be interrupted. Change of speed does not vary this relation since both are driven from a common motor. If desired, the dry materials may be pre-mixed and the mixers 14 used principally to cause the water to be distributed uniformly through the mass.

One construction is that in which three mixing units are employed, the middle one having a larger capacity than the others so that the layer which it supplies, (the middle layer of the sheet) may be thicker than the outer layers. This permits the use of less expensive material in the middle layer where appearance is of no importance. A greater amount of ground-up trim or scrap can be used in the middle layer without making the whole product too porous. It will be seen that the several mixtures may differ in composition, color and plasticity. A dry mix may be made in one unit while a wet mix is being made in others, since in pressing the dry layer will take up water from the wet layers. Likewise, a mineral fiber may be used in certain layers and a vegetable fiber in others or one or more layers may contain no cementitious material.

Another alternative is to omit the screw conveyors 22 leaving only an open duct and to make the mix sufficiently wet to give a fluent body of material which can pass by gravity flow to the spreader fans and exude onto the belt B. In such a modified structure, suction boxes beneath the bed plate are used to extract liquid from each layer as it is deposited and also from the full body of the sheet during the initial forming and pressing.

The forming and pressing mechanism

The three spreader units 23 being spaced longitudinally of the belt, the separate mixtures fed by each are deposited in superposed layers or strips which are carried by belt B away from the spreaders and beneath the belt C. The coaction of the belts B and C, together with the bed plate A and rotary cylinder sets D and E gives the forming and pressing which changes the plastic layered body into a thinner, concrete body of desired shape and size. By concrete is meant a relatively hard body having no planes of cleavage between the several layers, as distinguished from the initial body made up of discrete layers. The strip of course will not have attained its final "set" when delivered from between the belts but will be solid and partially set so that it may be cut. In many cases, no further pressing, as for instance, in stationary hydraulic presses, will be required. The mechanism will now be described.

The belt B travels over the bed plate A, over rollers 35 and 36 at the ends of the bed plates and, on its under side, it passes over and is driven by rollers 37, 38, 39. The roller 36 is adjustable on its supporting ways 40 by threaded rods 41 on either side to vary the belt tension.

The drive for belt B comes from a motor 43 through a shaft 44 which is driven through a worm and gear connection 45. The shaft 44 has two bevel gears 46, 47 which drive bevel gears on the shafts of rollers 37 and 39 respectively. The shaft of roller 37 carries a pinion 48 meshing with a pinion 49 on the shaft of roller 38 so that the latter is positively driven as well.

The shaft 44 extends in the opposite direction to the end of the machine where it carries a bevel gear 50 in mesh with a bevel gear on the shaft of the roller 35, thus effecting a drive of the belt at the point where it is drawn off the bed plate.

The bed plate is perforated over a portion of its length where the material is first deposited and where the initial forming occurs. Beneath the apertured portion are suction boxes 51 of any suitable type for creating a draft through the belt and the bed plate and through the material thereon. This holds the belt to the contour of the bed plate and removes excess of moisture from the plastic material. The bed plate is built in sections so that it readily may be replaced by another bed plate having a different surface configuration.

The roller sets D and E are identical in construction so, for convenience, only the set E (Figs. 1, 2 and 3) is described in detail.

A roller set, as shown here, has four rollers 55, 56, 57, 58, each of which has a shaft journalled in a frame composed of longitudinal side members 59, 60. The journal blocks of each roller shaft are vertically adjustable in ways 61 (see roller 57, Fig. 2, for example) by means of lockable screws 62 in order to vary the spacing between the rollers and belt B. Belt C travels over the end roller 58 of set E and over the corresponding end roller 63 of set D (Figs. 1, 4 and 9).

The end rollers 58 and 63 are spaced farther from belt B than are the other rollers to cause a convergence of belts B and C as they come together and a divergence as they part. The other rollers may be adjusted as desired to give a gradually increasing pressure.

The roller frame 59, 60 is, itself, vertically adjustable as a unit by moving the off-set blocks 42 which are guided in ways formed by the upright members 64, 65 of the machine frame. For this purpose, a member 66 supported by the main machine frame is rotatably mounted in each end of each of the side members 59, 60 but is so secured thereto that it has no axial movement relative to them. Hand wheels 68 actuate the transverse shafts 69 which carry the worms 70 which are in mesh with the gears 71 on the members 66. The two shafts 69 are interconnected on one side of the machine by a chain 72 engaging sprockets 73 on the shafts. The result is that the turning of either handwheel causes an equal movement of both side members 59, 60 simultaneously.

The four rollers in each set are positively driven at the peripheral speed of belts B and C. The drive is taken from the shaft of roller 38 by means of a vertical spindle 75 having a bevel gear connection to the shaft of roller 38 and to the shaft of the roller 55 (Fig. 3). The roller 56 is driven from roller 55, roller 57 from roller 56 and roller 58 from roller 57 by a series of chain and sprocket connections 76, 77, 78 on alternate sides of the machine. As stated above, the roller set D (Figs. 4, 5) is similarly constructed.

The belt B preferably is of canvas or duck such that air may pass through it as it passes over the suction boxes 51. It has a narrow strip of similar material along each edge on the outer side to prevent the plastic material from flowing off. When the machine is making a flat or tapered sheet, a thin flexible steel belt is used for the upper belt C as there is less tendency for the material to adhere to such a material, particularly when its outer surface is lubricated. When a corrugated or irregular surface product is being made, belt C is of 2 or 3 ply canvas or duck. Belt C is lighter than the carrier belt B.

The action of the two belts is to give a gradually increasing pressure akin to a rolling pressure but without the great difficulty, inherent in the use of direct rolling, that the material rides up on the rollers. In the present machine, the strip is sufficiently concreted when it reaches the end of the belts that the tendency to ride up on the upper belt is not great. With a lubricated steel upper belt, the tendency is even less. During the pressing there is no relative movement between the pressing elements so that the action resembles that of a hydraulic press. There is present, however, the continuity of operation not possible with such a press.

*The cutter H*

The continuous strip delivered at the end of the machine from between the belts B and C is cut into sheets of any predetermined length or into shingles by the cutter H. The cutting element is a rotary band saw 80 toothed on both edges. It is mounted on a rocking frame 81 above the level of belt B. At each end of the frame 81 is a substantially vertical stub shaft 82 on which is a pulley 83 for the band saw 80. These shafts are journalled in transversely adjustable blocks to adjust the tension of the saw. One stud shaft is driven through a pair of bevel gears 84, from a transverse shaft 85 driven by a belt connection 86 from a small electric motor 87. The motor is fixedly mounted on the side of the machine frame, with its drive shaft in line with the pivotal axis of the frame 81 so that the drive connection through the belt 81 may be maintained while the frame 81 is being rocked. If desired, the motor could be mounted directly on the frame 81.

The rocking frame 81 is pivoted as at 88 at both sides of the machine frame and is rocked by the plunger 89 of a solenoid 90. In rocking, one side of the band saw is swung down through the strip as it is delivered from the belts and through an opening 91 in the bed plate. The spacing between the sides of the saw—i. e., the diameter of the pulleys 83,—is such that only one side of the saw passes through. When the sheet has advanced the predetermined extent, the solenoid rocks the saw upward so that it cuts through the sheet and comes to a position from which it can move through another down stroke.

For determining the length of section formed by the cutter, the operation of the cutter is controlled from the main belt B, thus making the spacing of the cuts independent of the speed of the machine.

The solenoid 90 is energized by an electric circuit under control of a reversing switch 92 which at predetermined intervals reverses the direction of current through the solenoid windings. The switch 92 is operated through a variable speed, friction disc drive 93 of known construction from the belt B by a wheel 94 engaging the under side of the belt. The wheel 94 drives the disc 95 of the transmission and the driven disc 96, adjustable with respect to disc 95, turns on a spindle 97 and has a pin 98 at a point near its periphery.

A four pronged wheel 99 is located in the path of the pin 98 so that one arm is engaged and is given a quarter turn upon each passage of pin 98 by it. During most of the revolution of the disc 96, the prong wheel is left still. The wheel 99 is secured to the spindle of switch 92 so that upon each actuation by the pin 98, the wheel 99 gives the switch spindle a quarter turn, thus reversing the connections as will be clear from Figure 12 which shows the switch and the wiring connection schematically.

The size of the sheet or shingle formed by the cutter is varied by shifting the disc 96 toward or away from the axis of disc 95. This is accomplished by means of the handwheel 100 which is threaded on the spindle 97 and is detained from axial movement by the post 101 in which the spindle 97 is journalled. An indicator 102, calibrated in inches of sheet cut, aids in setting the disc 96 in proper position.

The spreaders

An important part of the invention is the construction and arrangement of the spreaders 23. The spreader is attached to the lower end of the duct leading from the mixer 14 by means of a socket joint 105 so that it may be adjusted vertically and horizontally with respect to the belt B. The spreader converges in the vertical dimension and diverges in the horizontal direction, both gradually, so that the body of material may change its shape without creating voids. The orifice of the spreader is generally rectangular to deliver a ribbon of material onto the belt B and is formed in an upstanding flange 106. A plate 107 is bolted to the flange 106 and has elongated bolt holes so that it may be adjusted vertically to vary the height of the orifice over the whole width or over part of the width, the latter being accomplished by inclining the plate (see Fig. 14).

As shown in Figure 15, two plates 108 and 109, may be used so that the orifice may be higher at the center than at the sides. With such plates there may be used a divider 110 inserted in the orifice to cause the material to issue in two ribbons or strips, each tapered in cross section or rectangular if desired. The divider 110 extends back into the spreader far enough to avoid disturbance of the issuing strip and is wedge-shaped to divide the material more easily (see Fig. 16.)

The width of the orifice or orifices is varied by means of gates 111 pivoted on the inner side walls of the spreader and controlled from outside by means of rods 112 which are pivoted in sockets in the gates and are threaded in the wall of the spreader or are otherwise secured thereto so as to be lockable in selective positions (see Figure 17).

Other modifications of the orifice are possible by using different shaped plates 107 and different configuration of the edges forming the orifice in the flange 106. For making corrugated sheets, the spreader shown in Figure 19 is used. The lower edge of the plate 107 is corrugated and the lower edge 113 of the orifice is correspondingly corrugated so that the material issues as a corrugated strip. As will be described hereinafter, the bed plate and rollers are also corrugated, when such a spreader is used, to preserve the cross-sectional shape given by the spreader. While the spreader shown is preferred, other shapes are possible. I use the word "spreader" in the sense of a nozzle adapted to deliver the material on to the belt in the form of a sheet or strip, relatively thin, and spread over the surface of the belt.

Corrugated sheets

In the description above, reference has been made to the capability of this machine of forming, in a continuous operation, a corrugated sheet which may be cut into sections for use as a sheathing or sheet roofing. When making sheets to be cut into shingles or into sections to be used for instance on walls, a flat sectional bed plate is used, and the orifices of the spreaders are of uniform height or are tapered as in Figs. 14 and 15. The rollers are of uniform diameters over the full width when a product of uniform thickness is desired, or they are tapered for the full width to suit a strip discharged from such an orifice as that shown in Fig. 14. When parallel oppositely tapered strips are delivered, as from a spreader such as that shown in Figure 15, the rollers are tapered in one direction through part of the width and in the opposite direction through the remainder. The underlying thought is to make the space between the belts B and C of the same shape as that of the strip formed in superposed layers by the spreaders.

No extensive changes are necessary in order to make a corrugated sheet. The sectional flat bed plate is removed and sections forming a corrugated bed plate are substituted, as shown in Figure 5. The spreaders with orifices corrugated to correspond to the bed plate corrugations (Fig. 19) are substituted for the spreaders of Figures 14 and 15. In addition, the rollers are provided with corrugated surfaces to give the belt C a contour conjugate with the contour, assumed by the belt C in travelling on the corrugated bed plate. The belt B is held against the corrugated bed plate due to the pressure differential created by the suction boxes 51. The space between belts is therefore of the shape which the finished product is to have. There is no transverse movement of material which might cause splits or weak spots along the tops of the corrugations. This is due to the fact that the plastic mixture is pre-formed of the desired shape and all the pressing is done between members which co-act to maintain that shape.

It is not necessary to substitute new rollers in changing from the manufacture of one type of product to another. As shown in Figure 21, the rollers are provided with shells 115, 116, each of which is semi-circular in cross-section and both of which are fitted together over the permanent inner cylindrical roller 117. These shells may be of uniform thickness, or they may be corrugated, or tapered from the center to the sides or from the sides to the center. They also may be tapered from end to end or may be given other shapes to maintain the cross-sectional shape given to the material by the spreader.

It will be appreciated that certain of the novel features disclosed here are useful with a single spreader having an orifice large enough to deliver a full thickness sheet. Certain novel features, including the underlying idea of a number of units forming superposed layers, also may be used whether the initial mixture is plastic or is dry. Further, so far as I am aware no practicable process or machine has been invented for the continuous manufacture from an initial plastic mixture, and for the economical coloration of products composed in the main of cementitious and fibrous materials. Also, I know of no continuous process of making a corrugated product. I therefore regard the features of this invention which make possible such manufacture by a continuous operation as being of great importance.

*The preferred form of machine*

In Figures 22–29 a preferred form of machine for carrying out the process is shown.

In this machine a wire mesh belt is used to convey the plastic. One layer of plastic at a time is laid on the belt. The first layer is conveyed through a dewatering unit wherein surplus water is pressed out of it through its top and bottom surfaces. Then a second layer is laid on the belt on top of the first layer, and both the layers are conveyed through another dewatering unit wherein the second layer is dewatered through its top surface and is concreted with the first layer forming a single thicker layer. Upon this thicker layer, a third layer is then laid and the whole is conveyed through a third dewatering unit wherein the third layer is dewatered through its top surface and is concreted with the thicker layer beneath it thus forming a single still thicker layer of plastic from which most of the surplus water has been removed. If desired, this layer or sheet of plastic may be then conveyed through a more powerful pressing and dewatering unit by which the layer may be still further dewatered and compressed. From thence the sheet may be conveyed to cutting mechanism by which the sheet is cut into sections after which it is removed from the machine.

Though the machine described can make a sheet having three laminations or layers, it may also be used to make a two or one layer product; or, by the addition of other units, sheets having more than three layers may be made following out my process.

The structure of the machine will now be described.

The machine is supported on a continuous framework 200, and an endless carrier belt 202 of about 40 gauge wire mesh, or equivalent runs from one end to the other of the framework passing around cylinders 204, 206 supported from bearings secured to the framework at either end. The continuous plastic sheet is carried along through the machine on the upper surface or upper half of this belt. To support the upper half of the belt a series of power driven small cylindrical rollers 208 are supported from the framework 200, within the carrier belt and contacting with the under surface of the upper half of the belt.

In this preferred form of machine, three mixing and distributing units, each comprising a superposed mixing tank, a hopper and a rotating distributing device such as 210T, 210H, 210D, respectively, are located at spaced points along and above the belt 202 so as to deliver the plastic to the belt 202 at spaced points along it so as to form superposed layers. It is possible to use the mixing tank and stirrer shown in Fig. 13, but I prefer to use a mixing device with a storing hopper located directly beneath it as shown in Figs. 24 and 28, a slidable gate 210g actuable by a hand rod 210r being provided at the bottom of the mixing tank to let the mixture into the hopper at the right moment.

The hopper 210H has a rectangular upper part composed of vertical side and end walls, and has a lower part composed of extensions of the end walls 210e and side walls which converge downwardly to a cylindrical casing in which the distributor is housed.

The distributor, as will hereinafter more fully appear, extends along the whole distance under the discharge outlet of the hopper which is not quite as long as the width of the machine or conveyer belt. In order that the mixture may be delivered from only a portion of the discharge outlet at certain times I have provided the hopper with extra end walls 210W which are movable and between which the mixed plastic is dropped and confined and let out on the distributor. Each end 210W lies parallel to the outer end walls 210e of the hopper and is of similar shape thereto. Each end 210W has three screw threaded rods 210d secured thereto, at points approximately equally spaced from one another, and extending perpendicularly to the ends 210W and passing freely through apertures in the outer ends 210e. Over these apertures there are rotatably mounted, within U-brackets 210b and on the ends 210e, internally threaded gear pinions 210p which cooperate with worm gears 210m on shafts 210s that are rotated through other worm and worm pinion gearing by the hand wheel 210n. By extending the hand wheel shaft 210q to connect with both of the end-wall-moving mechanisms, the end walls 210W can be moved simultaneously.

The capacities of the mixing tank and storing hopper may be as desired, but it is preferable to have them of such capacity that a large enough batch of plastic may be mixed and stored to insure a continuous delivery to the conveyor belt for making a sheet of the maximum thickness for the machine, when the machine is running at its maximum speed. If the machine is provided with a large enough storing hopper and mixing tank, the amount of material mixed may be decreased if the speed of the machine is lowered or if the thickness of the layer is lessened.

*The distributor*

One form of device which I have invented for taking the plastic mixture from the hoppers and laying it on the belt or on a previously formed layer is shown in Figs. 26 and 27. It comprises a hollow hub 300 rotatably mounted horizontally in horizontal supporting members 302 mounted on the machine frame 200, and having a plurality of longitudinally extending peripheral slots into which are wedged plates or fins 304 which extend radially from the hub. The rotation of the hub may be accomplished by any suitable gear mechanism G.

Between the fins 304 are adjustable devices which together with the fins form pockets for reception of the plastic material, the fins forming the sides of the pockets and the adjustable devices forming the bottoms of the pockets. The adjustable devices comprise metal bars 306 which are supported at their ends for radial movement, as will hereinafter appear. Around the bars 306 and secured to the inner edges thereof are two-part sleeves 308 which serve as the bottoms of the pockets. These sleeves are each made up from two identical resilient plates bent in channel form with one flange 308F longer than the other 308f, the angle of the long flange with the plate being acute and the angle of the short flange with the plate being oblique so that when the device is assembled it takes a wedge form. The short flanges 308f are secured to the inner edge of the adjusting bars 306 but the long flanges are permitted to overlie the outer edge of the bars and to slide upon one another, in order that as the devices are moved radially between the fins toward and away from the hub 300 the sleeves will expand and contract thus making a wider or narrower bottom to suit the width of the lower portion of the pocket whether the pocket is deep or shallow.

In order to move the adjusting bars 306 toward and away from the hub 300 a conical, pocket-adjusting member 310 is slidably mounted on each end of the hub. The ends of each adjustment bar 306 are slidably connected with the conical faces of the conical members by dove tail mortise and tenon joints, the tenons being formed on the end edges of the bars, which are cut obliquely, complementally to the conical face of the cone members. The cone members 310 are connected by keys 312 with the slidable pistons 314 within the hub 300. To permit axial sliding of the cone members and pistons relative to the hub, longitudinally extending slots 316 are cut in the hub for the keys 312.

To cause the pistons 314 and thereby the cone members to move along the hub 300 simultaneously a rod 318 extends within and concentrically with the hub and through the pistons, with which it has screw thread engagement.

The rod 318 need only be screw threaded at and near where it passes through the pistons since only a small amount of axial movement of the pistons is necessary to regulate the depth of the pockets. Obviously one of the screw threads must be right hand and the other left hand so that the pistons will move together or apart and not in tandem.

One end of the rod 318 is extended beyond the end of the hub 300 and has a hand wheel 320 mounted thereon. This end of the rod is supported by a bearing 322 held in the end of the hub, the hand wheel 320 and a collar 323 engaging the bearing on the opposite sides in order to hold the rod from moving axially.

From the foregoing it will be obvious that rotation of the hand wheel 320 will cause the conical members 310 to move axially toward or away from each other thereby pushing the adjustment bars 306 and pocket bottoms 308 away from the hub 300 or pulling them toward the hub to shallow or deepen the pockets.

Due to the cutting away of a substantial portion of the metal at the ends of the adjustment bars 306 to form the tenons, the joint between the adjustment bars 306 and conical members 310 may not be as strong as is desirable when a thick layer of heavy plastic is to be laid by the distributor. Therefore, in order to support the adjustment bars disc members 324 are fixedly mounted on the hub near the conical members 310. The disc members have a series of radial slots 326 equal in width and number to the adjustment bars 306. As the bars are adjusted to vary the pocket depth they slide radially in the slots, and the bars are supported against circumferential displacement by the sides of the slots.

In operation, the distributor is rotated continuously at a uniform speed through appropriate gearing by a motor (not shown). During its rotation the pockets of the distributor become filled with the plastic material which falls upon the belt 202 in transverse strips or slats as the pockets approach and become inverted over the belt at the lowermost point in their rotary path. Thus as the carrier belt moves along it has deposited on it a layer composed of a series of parallel transverse slats which, if the plastic mixture is sufficiently wet will flow or merge together as soon as they are deposited on the belt. On the other hand if the mixture is stiffer the strips may be merged as they pass under the roller 238, hereinafter described.

The feeding apparatus thus far described is more particularly described and is claimed in my copending application Serial No. 576,173, filed November 19, 1931, which has become Patent No. 1,929,301 and insofar as I claim it therein, I make no claim to it here.

The dewatering units

It is well understood that the strength of concrete bears a definite relation to the water-cement ratio of the mix. Obviously it is desirable to obtain as strong a final product as needful and possible. Hence it would appear to be desirable to adhere as closely as possible to a predetermined ratio for optimum strength. On the other hand strict adherence to this ratio is accompanied by the difficulty that the mix can not be handled mechanically with sufficient facility. Therefore an additional amount of water over and above that used to bring about the desired water-cement ratio, is used to give the requisite plasticity for fashioning the desired product. In the present case the plasticity must be such that the mix will flow on the distributor and can be laid on the conveyor belt in slats as hereinbefore described. Also, the additional amount of water will be quite considerable on account of the absorbent nature of the fibrous aggregate used in the mix. For convenience I will call the aforesaid additional amount of water, "surplus" water.

I have used the word "dewatering" to describe one function of the units of the machine, which are now to be described, this function being the removal of a considerable portion of the surplus water from the layers. Other functions of the dewatering units are to compress the layers and to cause the concretion of the superposed discrete layers as they pass through certain of the units.

The plastic mixture is carried along by the belt 202, from the distributing unit 210 to a dewatering unit 216 between the distributing units 210, 212. Similar dewatering units 218, 220 are placed between the distributing units 212, 214 and between the unit 214 and the delivery end of the machine. Each dewatering unit comprises four presser cylinders 230—233 located at the center of the unit; and two belt rolls or cylinders 236, 238 one at each end of the unit; and four small cylinders or rollers 240 near the center of the unit and above the presser cylinders. All these cylinders are parallel to one another and their axes are transverse to the machine, and all are supported at their ends by bearings carried by the frame of the machine. An endless 24 gauge wire mesh belt 237 is placed around the cylinders 230—233, 236, 238 and over two of the cylinders 240 and under the other two as shown in Figure 24. Directly beneath each of the presser cylinders 230—233 is one of the carrier belt supporting rollers 208 so that as the plastic sheet is conducted through the dewatering unit on the carrier belt 202 it will be pressed between four pairs of rollers, for example 230—208 form one pair. Rotating brushes 241 and 243 and streams of water keep the meshes of the belts 202, 237 open.

I have found that the plastic layer may be more satisfactorily worked if the belt 237 is inclined slightly to the conveyor belt 202 by locating each of the cylinders 238, 233, 232, 231, 230 a little nearer the belt 202 than its predecessor. In this way the pressure on the layer is gradually applied and increased and a better product results.

The bearings 236b, 238b of the cylinders 236, 238 are movable vertically upon the uprights 242 of the frame, with which the bearings are slidably engaged. To adjust the height of these bearings and hence of the cylinders, horizontal rods 244 have hand wheels 246 on them, and by a worm and pinion gearing these hand wheels can rotate vertical screw rods 248 engaging in screw threaded sleeves 249 formed integral with bearings 236b, 238h, and thus cause the bearings and sleeves 249 to ride up and down the rods 248.

On opposite sides of the machine are pairs of parallel, horizontal, lengthwise-extending beams 250—250a, one above the other and secured together at their ends by a pair of vertical angle irons 251, thus forming a carriage for the cylinders 230—233 of the dewatering unit. Each pair of these beams is vertically adjustable at each end by the rotation of a fixedly located screw rod 252 engaging with a screw-threaded sleeve 253 on each beam. The rotation of these rods 252 may be accomplished by hand wheels 254 having worm pinion and worm gear connections with the screw rods.

Suspended from the upper beam 250 and slidably engaged with the lower beam 250a are bearings 256a, b, c and d, for the cylinders 230—233, all of which are vertically adjustable relative to the beams 250-250a, by means of screw threaded connecting rods connecting the beams and the bearings. As will hereinafter appear it is desirable to simultaneously adjust opposite ends of adjacent cylinders. Therefore, the upper ends of alternate connecting rods for example, the connecting rods for the cylinder 230, 232, are provided with worm wheels 260 which engage with worm gears 262 which are on a horizontal rod 264 extending lengthwise of the machine, that rod being rotatable by a hand wheel 266 through another worm gear and pinion connection 268. Upon the opposite side of the machine, a rod equivalent to rod 264, by mechanism similar to that just set forth, enables the adjustment of the ends, on that side of the machine, of cylinders 231, 233, and that rod as well as rod 264, is controlled by the hand wheel 266. Thus, hand wheel 266 causes simultaneous movement of opposite ends of adjacent cylinders. By reason of this adjustability of one end only of each cylinder a crowned sheet of plastic may be rolled out, that is to say, the sheet will taper off from the middle toward the edges. Fig. 25 shows the cylinders adjusted for a tapered sheet.

All the rollers and cylinders are driven at constant speed by a motor through appropriate gearing, in such a way that all the belts and peripheries of the cylinders have the same speed.

Thus as the layer of material is laid upon the belt by the first distributor 210D it is carried along at constant speed to the first dewatering unit 216 where it passes between the conveyor belt 202 and the dewatering belt 237 of the dewatering unit. As the layer passes beneath the cylinders 230—233 surplus water is pressed out of it through both the upper and lower belts. If the cylinders 230—233 are set as shown in Fig. 25 then the layer of plastic will be crowned in the center. The single layer thus made may be carried on belt 202 to the pressure cylinders 270—272 but generally I prefer to make a product of a plurality of layers and in that case the following procedure is carried out.

The first layer having been dewatered it is carried on by the conveyor belt beneath the second distributor 212. Here a second layer of plastic is deposited on the conveyor belt 202 on the top of the first layer. Both layers are carried by the conveyor belt through the second dewatering unit which, it will be remembered, is exactly the same in construction as the first unit. In the second dewatering unit surplus water is pressed from the upper or second layer of plastic, the water passing off through the upper belt of the dewatering unit, since the lower layer of plastic is practically impervious to water. While passing through the second dewatering unit the two layers of plastic, which up to this point have been discrete, are concreted into a thicker layer, which is conveyed onward by the carrier belt 202, beneath the third distributor unit 214. Here another layer of plastic is laid on the belt on top of the thicker plastic layer. This new layer is dewatered and concreted with the thicker layer in the same manner as was the second layer.

When a small amount of surplus water is used in the plastic the transverse strips deposited on the conveyor belt by the distributor will have less tendency to flow together as soon as they fall on the belt. However these strips are flattened out and merged as they pass through the dewatering unit and there is complete union between adjacent strips so that it is impossible to tell where one strip ended and another began.

Instead of laying the layers of plastic on the belt 202 by means of a distributor, such as 210D, the layers may be spread on the belt by the spreaders hereinbefore described; or still other means to accomplish the same purpose may be devised. However, if a distributing cylinder is used in connection with the hopper 210H the width of the sheets may be varied, or a thick narrow layer may be laid down and pressed out in the dewatering units to the width of the belt or a lesser width, as desired. Thus the width of the layer may be regulated in a variety of ways to suit the desires of the manufacturer.

Treatment of the concrete sheet

The sheet passing from the last dewatering unit is a concrete sheet to make up which one or more layers may have been used. The further treatment of this sheet is dependent on the product to be made.

If load bearing articles are made the sheet may be cut into small units which afterward are compressed under great pressure in a hydraulic press.

If non-load bearing products such as wall panel sheets, wall tile sheets and the like are made, further and greater compression of the continuous sheet may be accomplished before it is cut into the small, wall tile or wall panel sheets. For this purpose I provide a series of cylindrical pressure rollers 270—272 having bearings mounted in a carriage 274 like that carriage 250, 250a, 251 used for the dewatering unit cylinders 230—233. The bearings of the rollers 270—272 are secured in the carriage 274 by four bolts, the ends of which abut the bearings at points spaced 90° apart, whereby minor adjustment of the rollers 270—272 is made possible without changing the position of the carriage. The carriage 274 is vertically adjustable as a whole by mechanism exactly like that used for the adjustment of the dewatering unit carriages, hence it need not be described further. By means of this adjustability sheets of different thicknesses can be pressed, and the degree of pressure can be varied. As in the dewatering units so also in the compression unit, an endless belt 275 is passed around the rollers 270—272. This belt preferably is rubber, but may be polished steel or wire mesh if desired. This belt also passes around cylinder 276 which is located directly above the cylinder 206 and is of equal size thereto, and it also passes around a cylinder 277 which is vertically adjustable on vertical members of the frame 200, by bolts passing through slots in the vertical members. The slack of this belt 275 may be taken up by a guide roller 278 which is mounted on and vertically movable relative to the framework 200.

As a matter of course certain of the supporting rollers 208 are located directly below the rollers 270—272, so that the compression of the continuous sheet may take place between them and the rollers 208.

The same motor which drives the dewatering units, and rotates the distributors and causes movement of the dewatering and conveyor belts, may be used to drive the compression rollers 270—272 through appropriate gearing. The actual construction and operation of all this gearing is a matter of mechanical skill and need not be described other than to say that the peripheral speed of all the belts and rollers in contact therewith are determined by, and are controlled so as to be the same as, the desired speed of the conveyor belt 202.

Coloration

The process and machine described here are particularly suited to the manufacture of colored products. The two usual ways of coloring products of the sort here concerned are to apply a coloring agent to the surface as a veneer or to mix it all through the plastic mass before it is pressed. The chief disadvantage of surface coloration is its lack of durability under the erosion of the weather when the product is used out of doors. The coloration by complete impregnation of the product with a coloring agent is durable but very expensive.

In the present process, the coloring agent is added only to the body of mixed cementitious and fibrous ingredients which is formed into an outer layer of the initial mass and which becomes the outer thickness of the final concrete body. The coloration extends to a substantial depth, as distinguished from surface or veneer coloration, and is therefore as durable under weather erosion as a product colored throughout. It effects a saving of two thirds or more when the initial mass is three layered, as shown in the drawings, since the outer layer need not be as much as a third of the total thickness.

So far as I am aware, there has never been known a product of this sort—i. e., one having cementitious and fibrous materials as its principal and characterizing ingredients—in which the coloring agent is present in the material and not merely on its surface, and to a depth sufficient to resist erosion by the weather yet not extending all the way through the product. Thus, the desirable qualities are present without entailing the cost of complete coloration.

The present process and apparatus makes available and practicable certain coloring agents which generically may be described as those organic pigments or stable lake colors which may be combined with the plastic alkaline material forming the body of the products here concerned without chemical decomposition. These organic pigments are known and are extensively used. Before this time their cost and the lack of a practicable and economical way of adding them to the product have prevented their use in cementitious fibrous sheets for walls and roofing or for shingles.

This invention makes it practicable to use these organic pigments alone or in conjunction with metal oxide pigments and thus to obtain more varied colors and mottled vari-colored effects in each sheet or shingle.

I have also found a material which, to my knowledge, heretofore has not been used for coloring products of this class and which, while being extremely inexpensive and readily procurable, is satisfactory for giving a red color to the products. It may be finely ground as usual and added to the initial mix in the same way as the finely ground oxide pigments are added, or it may be crushed only to a coarse size so that when added to the outer layer of the strip it will give a rough pebbled surface thus enhancing the decorative qualities of the product. This material is an impure red oxide of iron formed as a clinker residue in the manufacture of sulphuric acid from iron pyrites.

In the manufacture of shingles by the machine first described it is possible to effect a greater saving in coloring material by taking advantage of the fact that only the exposed butt of the shingle need be colored. The spreader which is delivering the outer layer may be set for a narrow width by swinging its gates 111 toward the center. With a divider 110 in each spreader the machine will be forming two strips, tapered slightly if desired, from which two series of shingles may be cut. With the orifice of the last spreader narrowed, the colored mixture is delivered in a strip extending only over the inner parts of the previously delivered uncolored layers and therefore forms a butt having colored material to a substantial depth. The subsequent pressing between belts B and C removes the sharp line of demarcation between this top, partial layer and the other full width layers. In this way only one-sixth or less of the shingle contains the coloring agent, yet the result, for all practical purposes, is the same as if the whole shingle were colored.

When one orifice is narrowed in this manner, it is desirable to reduce the volume of material fed to that spreader. This obviously may be done by reducing the volume of dry materials delivered from the well 11. The spiral conveyor in the well delivering to the last spreader may be provided with an individual drive for this purpose. The same result would be obtained by providing an individual drive for the screw conveyor 22 delivering to the last spreader so that its speed could be reduced.

An equivalent saving can be made in the manufacture of shingles on the machine second described, because the distributor which is laying the outer layer may have the plastic mixture delivered to only its center portion by reason of the movable ends of the hopper being set for such delivery.

The description above of coloration of the product by adding a coloring agent to the plastic mixture has reference to coloring agents such as metal oxide pigments or lamp black or other suitable color pigments. The number of colors obtainable in this manner is limited and each side of each strip is of a single color.

In Figures 17 and 18 are shown the means for adding the organic pigments which may be applied in a pasty or in a dry form or semi-liquid form. A number of inlet nipples 120 are provided in the upper surface of the last spreader. Inwardly opening check valves may be provided in these connections to prevent loss of the plastic mixture when pigments are not being added.

The pigments with a cement to give a mixture are injected into the material in the spreader and, in passing through the spreader orifice and between the belts, each body of pigment is spread somewhat giving a region of color. The nipples are so spaced that, if all are used, the regions of color are close together or even may merge. The pigment is sufficiently deep in the sheet to withstand weather erosion but no inordinate amount of pigment is necessary. Different colors may be used to give a mottled effect. This mottled effect may be obtained where the outer layer is given a solid color by adding a pigment to the whole mixture forming that layer and then injecting a pigment at spaced points to form local color regions in the solid color. It is possible also to use metallic pigments in this manner in vari-colored combination or along with lake pigments of various colors. The layer into which the pigments, either the metallic oxide or the lake pigments, are injected may be an uncolored layer or it may have an initial solid color by reason of the admixture with it of a pigment while in the mixer 14.

In the preferred machine shown in Figures 22-25 beside the coloration of one layer it is possible to produce a mottled effect by making one layer very wet, either with or without color being added to it, and then superposing on it another layer of another color and concreting these layers. For example the mixture of plastic in the first layer may be made very wet so that a measurable amount of surplus water remains in it after it has passed through the first dewatering unit. No color will be added to this layer. Then the second layer, with color mixed in it, may be laid on. In passing through the second dewatering unit the two layers are concreted and the sheet emerges with a mottled appearance. Alternatively the first layer may be colored with a color different from the second to give a different mottled effect.

*The products*

The product therefore may be described generally as being of strip form, i. e., having considerably greater lateral extent than thickness, made up principally of fibrous material bound together by cementitious material and comprising concreted layers which may or may not be of identical composition. Further, having reference to the colored product, at least one of the concreted layers contains a coloring agent throughout or, as an alternative, it contains local regions having a coloring agent present, the colors being either the same in all regions or different, as desired, and the local color regions existing either in an uncolored layer or in a layer having a coloring agent throughout. There is also the product in which only a portion of a layer is colored throughout, as for instance, the butt or that portion of the outer layer of a shingle which would be exposed on a building.

More specifically, there is the product having a colored roughened surface by reason of the presence in an outer layer of a coarsely ground coloring agent, in particular, the impure red oxide of iron obtained as described above.

In some cases, it will be possible to use the machines described herein to make a laminated product in which one or more layers have no cement but simply a vegetable fiber having sufficient gelatinous material to bind the fibers together when pressed. The machines will bind such a layer either to a cementitious layer or between cementitious layers, or it will make a board or mat of several layers of fibrous material containing a non-cementitious binding material, the layers in any case being concreted by the pressing operation.

From the foregoing it will be apparent that many modifications within the scope of my invention may be made and therefore I do not limit myself to the embodiments shown.

I claim:—

1. In combination, a bed plate having its upper surface longitudinally corrugated, an endless carrier belt adapted to travel over said surface and capable of assuming the contour thereof, means for forming a strip of plastic material on said belt as it passes over said bed plate, a second endless belt above said carrier belt and corrugated rollers within said second belt adapted to press said belt against the material on said carrier belt.

2. In combination, a bed plate having its upper surface longitudinally corrugated, an endless carrier belt adapted to travel over said surface and capable of assuming the contour thereof, a second belt above said first belt and means for giving its surface toward the carrier belt a contour conjugate with that of the bed plate surface, and means for forming a strip of plastic material on said carrier belt in advance of said upper belt whereby it may pass under said upper belt and be pressed.

3. In combination, a mixing plant for making a number of mixtures of cementitious material and fibrous material, an endless carrier belt, a plurality of ducts for delivering said mixtures from said plant to said belt, each of said ducts having a spreader adapted to deliver a thin layer of material onto said belt, said spreaders being spaced along the belt whereby a strip of superposed layers is formed.

4. In combination, an endless carrier belt, a series of spreaders spaced along a portion of said belt to deliver material thereon in strip form, certain of said spreaders having a divider in the path of the material to divide the strip longitudinally.

5. In combination, an endless carrier belt, a series of spreaders spaced along a portion of said belt to deliver material thereon in strip form, certain of said spreaders having inlet openings in their upper wall whereby a coloring agent may be introduced into the material within the spreader.

6. In combination, an endless carrier belt, a series of spreaders spaced along a portion of said belt to deliver material thereon in strip form, certain of said spreaders having means enabling the introduction of a coloring agent into the material within the spreader.

7. The process of manufacturing in strip form a product having fibrous material and cementitious material as its principal ingredients, which comprises forming a plurality of continuous superposed layers each fabricated from a series of parallel slats, continuously advancing said layers, and subjecting said layers to pressure to remove surplus water and to concrete them.

8. The process of manufacturing in strip form a product having fibrous material and cementitious material as its principal ingredients, which comprises forming a plurality of continuous superposed layers each fabricated from a series of parallel slats, continuously advancing said layers, and subjecting said layers in succession to pressure to remove surplus water and to concrete them.

9. The process of manufacturing in strip form a product having fibrous material and cementitious material as its principal ingredients, which comprises forming a plurality of continuous superposed layers, each layer being composed of a series of parallel slats, continuously advancing said layers while permitting said slats to flow together, and subjecting said layers to pressure to remove surplus water and to concrete them.

10. The process of manufacturing in strip form a product having fibrous material and cementitious material as its principal ingredients, which comprises forming a plurality of continuous superposed layers, each layer being composed of a series of parallel slats, continuously advancing said layers while permitting said slats to flow together, and subjecting said layers to pressure in succession to remove surplus water and to concrete them.

11. The process of manufacturing in strip form a product having fibrous material and cementitious material as its principal ingredients, which comprises forming a layer composed of a succession of narrow slats, continuously advancing said layer while permitting said slats to flow together, subjecting said layer to pressure to remove surplus water, forming and superposing one or more continuous layers in succession on the first mentioned layer, and pressing said superposed layers in turn to remove the surplus water and to simultaneously concrete the layers.

12. In combination with an endless belt supported by a plurality of horizontal cylindrical rollers, a carriage, a plurality of cylindrical members supported by said carriage, one end of certain of said members being readily movable toward and away from said belt while the other ends of said members remain stationary, whereby a tapered sheet of plastic material may be pressed.

13. In combination with an endless belt supported by a plurality of horizontal cylindrical rollers, a carriage, a plurality of cylindrical members, supported by said carriage, opposite ends of certain of said members being readily movable toward and away from said belt while the other ends of said members remain stationary, whereby a tapered sheet of plastic material may be pressed.

14. In combination with an endless belt supported by a plurality of horizontal cylindrical rollers, a carriage, a plurality of cylindrical members supported by said carriage, one end of certain of said members being readily movable toward and away from said belt while the other ends of said members remain stationary, said carriage being readily movable toward and away from said belt, whereby tapered sheets of plastic material of different thicknesses may be pressed.

15. In combination, an endless belt, means for mixing cementitious materials and fibrous materials, means to deliver said mixtures on said belt in layers, means to press said layers to remove surplus water and concrete them, said means being adjustable whereby a tapered sheet may be pressed.

16. In combination, an endless belt, means for mixing cementitious materials and fibrous materials, means to deliver said mixtures on said belt in layers, means to press said layers to remove surplus water and concrete them, and means to incline said pressing means whereby a tapered sheet may be pressed.

17. In combination, an endless belt, means for mixing cementitious materials and fibrous materials, means to deliver said mixtures on said belt in layers, means to press said layers to remove surplus water and concrete them, and means to incline a portion of said pressing means in one direction and another portion in the opposite direction whereby a tapered sheet may be pressed.

18. The process of forming a continuous strip of plastic material, comprising forming continuously a plurality of parallel slats of plastic material, continuously advancing said slats in succession while subjecting them to pressure to unite them into a strip.

19. The process of depositing plastic material on a moving belt comprising forming continuously a plurality of parallel slats of the material and laying them on the belt in succession.

20. The process of making a product in layers from plastic material, comprising forming a series of slats of the plastic subjecting said slats to pressure to integrate them into a layer, depositing another series of slats of plastic material on said layer, and subjecting the whole to pressure.

21. The process of making a continuous multilayer unitary strip from plastic material, comprising forming a series of slats of plastic material, continuously advancing them while compressing them into a concrete layer, forming another series of slats and depositing them upon said layer, and compressing the whole into a unitary strip while continuously advancing the same.

22. The process of producing a multi-layer product with a mottled surface comprising forming a layer of plastic material containing a large surplus of water, subjecting said layer to pressure, forming and superposing upon said first layer a stiffer second layer of plastic material of a different color having a small surplus of water, and subjecting both layers to pressure simultaneously to remove surplus water and concrete said layers.

23. The process of producing a multi-layer product with a mottled surface comprising forming a layer of plastic material, forming and superposing upon said first layer a stiffer second layer of plastic material of a different color, and subjecting both layers to pressure simultaneously to remove the surplus water and concrete said layers, said first layer being of sufficient plasticity to permit the forcing through it of portions of said second layer, during the subjection of said layers to pressure, causing a mottled surface to be produced.

24. The process of producing a multi-layer product with a mottled surface comprising continuously forming and advancing a layer of plastic material containing a large surplus of water, subjecting said layer to pressure, continuously forming and superposing upon said first layer a stiffer second layer of plastic material of a different color having a small surplus of water, and subjecting both layers to pressure simultaneously to remove the surplus water and concrete said layers.

25. The process of producing a multi-layer product with a mottled surface comprising continuously forming, and advancing a layer of plastic material, continuously forming and superposing upon said first layer a stiffer second layer of plastic material of a different color, and subjecting both layers to pressure simultaneously to remove the surplus water and concrete said layers, said first layer being of sufficient plasticity to permit the forcing through it of portions of said second layer, during the subjection of said layers to pressure, causing a mottled surface to be produced.

26. The process of producing a multi-layer product with a mottled surface, comprising depositing on a conveyor a series of transverse strips of plastic material containing a large surplus of water, subjecting said layer to pressure, forming and superposing upon said first layer a stiffer second layer of plastic material, of a different color having a small surplus of water, and subjecting both layers to pressure simultaneously to remove surplus water and concrete said layers.

27. The process of producing a multi-layer product with a mottled surface comprising depositing on a conveyor a series of transverse strips of plastic material containing a large surplus of water, forming and superposing on said first layer a stiffer second layer of plastic material of a different color, and subjecting both layers to pressure simultaneously to remove the surplus water and concrete said layers, said first layer being of sufficient plasticity to permit the forcing through it of portions of said second layer, during the subjection of said layers to pressure, causing a mottled surface to be produced.

28. The process of producing a multi-layer product with a mottled surface comprising forming a layer of plastic material containing a large surplus of water, subjecting said layer to pressure depositing upon said first layer, a series of transverse strips of stiffer plastic material having a small surplus of water and being of a different color than said first layer, and subjecting both layers to pressure simultaneously to remove surplus water and concrete said layers.

29. The process of producing a multi-layer product with a mottled surface comprising forming a layer of plastic material, forming a second layer of plastic material, which is stiffer and of a different color than the first layer, by depositing on said first layer a series of transverse strips of said stiffer material and subjecting both layers to pressure simultaneously to remove the surplus water and concrete said layers, said first layer being of sufficient plasticity to permit the forcing through it of portions of said second layer, during the subjection of said layers to pressure, causing a mottled surface to be produced.

30. The process of producing a multi-layer product with a mottled surface comprising continuously forming and advancing a layer of plastic material, continuously forming and superposing upon said first layer a stiffer second layer of plastic material in a different color by depositing a series of transverse strips of said stiffer material, and subjecting both layers to pressure simultaneously to remove the surplus water and concrete said layers, said first layer being of sufficient plasticity to permit the forcing through it of portions of said second layer, during the subjection of said layers to pressure, causing a mottled surface to be produced.

31. The process of producing a multi-layer product with a mottled surface comprising forming a layer by continuously depositing a series of transverse strips of plastic material upon a conveyor, continuously advancing said layer, continuously forming and superposing upon said first layer a stiffer second layer of plastic material of a different color, and subjecting both layers to pressure simultaneously to remove the surplus water and concrete said layers, said first layer being of sufficient plasticity to permit the forcing through it of portions of said second layer, during the subjection of said layers to pressure, causing a mottled surface to be produced.

CLEMENTS BATCHELLER.